United States Patent [19]

Pertile

[11] Patent Number: 5,518,080
[45] Date of Patent: May 21, 1996

[54] SNOW VEHICLE

[76] Inventor: Liano Pertile, Strada Capinera 20, I-18038 Sanremo, Province of Imperia, Italy

[21] Appl. No.: 305,327

[22] Filed: Sep. 15, 1994

[30] Foreign Application Priority Data

Sep. 22, 1993 [IT] Italy .................................. GE93A0083

[51] Int. Cl.⁶ .................................................. B62B 13/00
[52] U.S. Cl. ........................ 180/190; 280/22.1; 280/28.14
[58] Field of Search ................................ 280/845, 15, 16, 280/17, 21.1, 22.1, 23.1, 28.14; 180/182, 186, 190, 191

[56] References Cited

U.S. PATENT DOCUMENTS

| | | | |
|---|---|---|---|
| 1,672,782 | 6/1928 | Ring | 280/28.14 X |
| 2,905,479 | 9/1959 | Schomers | 180/182 X |
| 3,583,507 | 6/1971 | Trautwein | 180/182 X |
| 3,664,446 | 5/1972 | Burtis et al. | 180/184 |
| 3,682,495 | 8/1972 | Zaimi | 180/182 X |
| 3,794,131 | 2/1974 | Freedman et al. | 180/184 |
| 3,799,565 | 3/1974 | Burtis et al. | 180/182 X |
| 3,861,492 | 1/1975 | Jensen, Sr. | 180/182 |
| 3,884,314 | 5/1975 | Callaway | 180/182 X |
| 3,917,301 | 11/1975 | Fabris | 280/28.14 |
| 4,193,609 | 3/1980 | Bissett | 280/28.14 |

FOREIGN PATENT DOCUMENTS

| | | | |
|---|---|---|---|
| 497519 | 11/1953 | Canada | 180/182 |
| 986197 | 7/1951 | France | 180/190 |

*Primary Examiner*—Kevin T. Hurley
*Attorney, Agent, or Firm*—Larson and Taylor

[57] ABSTRACT

A snow vehicle comprises at least one runner (20, 20'; 54) by way of a ski which is mounted in such a way that it can be tilted and/or steered by means of manual tilting and/or steering members (5) connected actively to actuators (17, 18, 22, 17', 18', 22'; 153) for tilting and/or steering the runner (20, 20'; 54). In order to ensure greater ease, accuracy and reliability of steering, the invention provides that the manual tilting and/or steering member (5) is connected to the runner (20, 20', 54) tilting and/or steering actuator (17, 18, 22, 17', 18', 22', 153) by means of a transmission system (30, 26, 27, 126, 127, 26', 27', 126', 127'; 60, 61, 60', 65, 66, 67, 67') constructed in such a way as to be mechanically rigid i.e. with little or no play relative to the position of tilting and/or steering. The vehicle may be of the so-called snowmobile kind, or else a vehicle with no means of propulsion and adapted only to descent, similar to a skibob. The invention also includes further improvements to the structure of the frame of a snow vehicle.

29 Claims, 8 Drawing Sheets

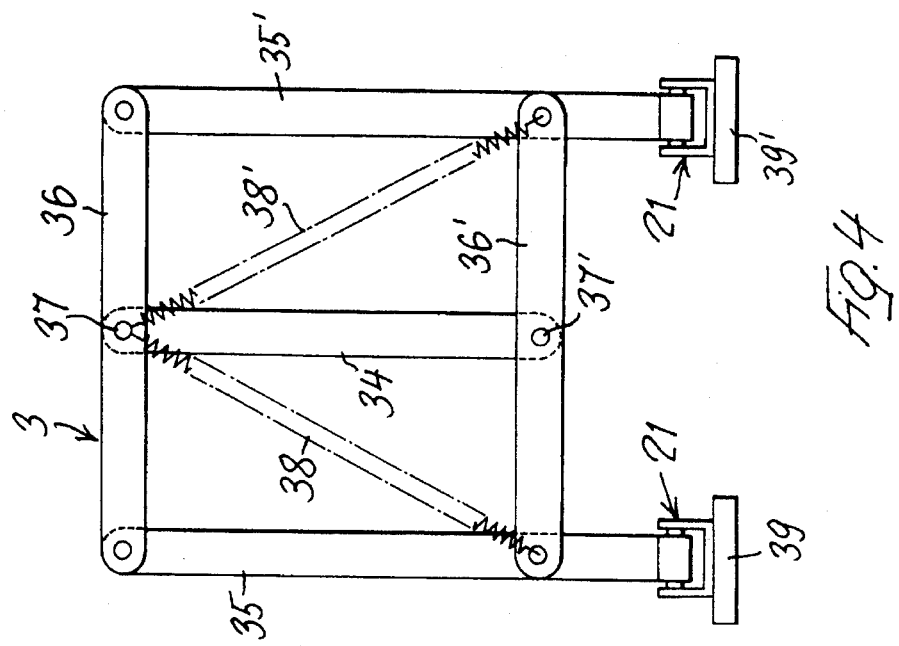
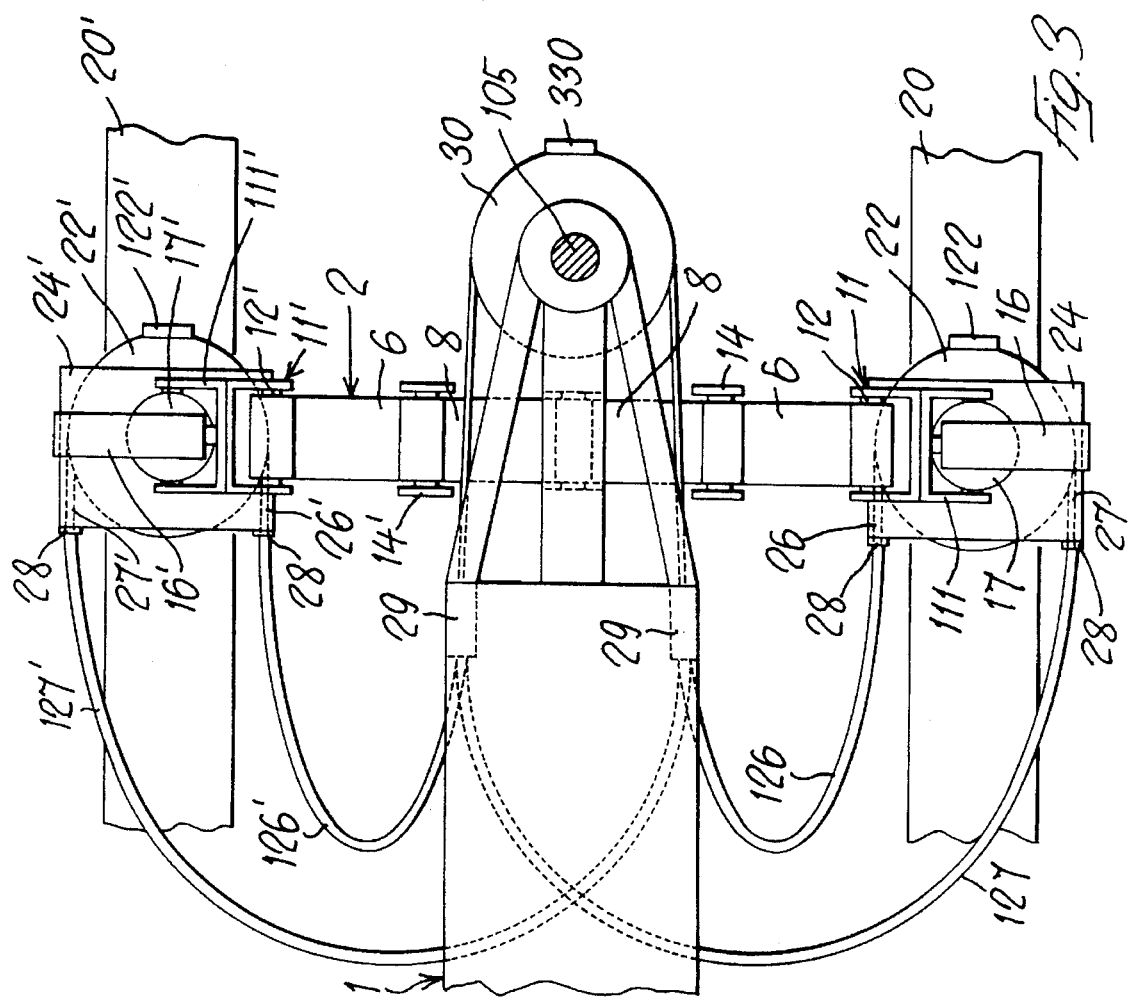

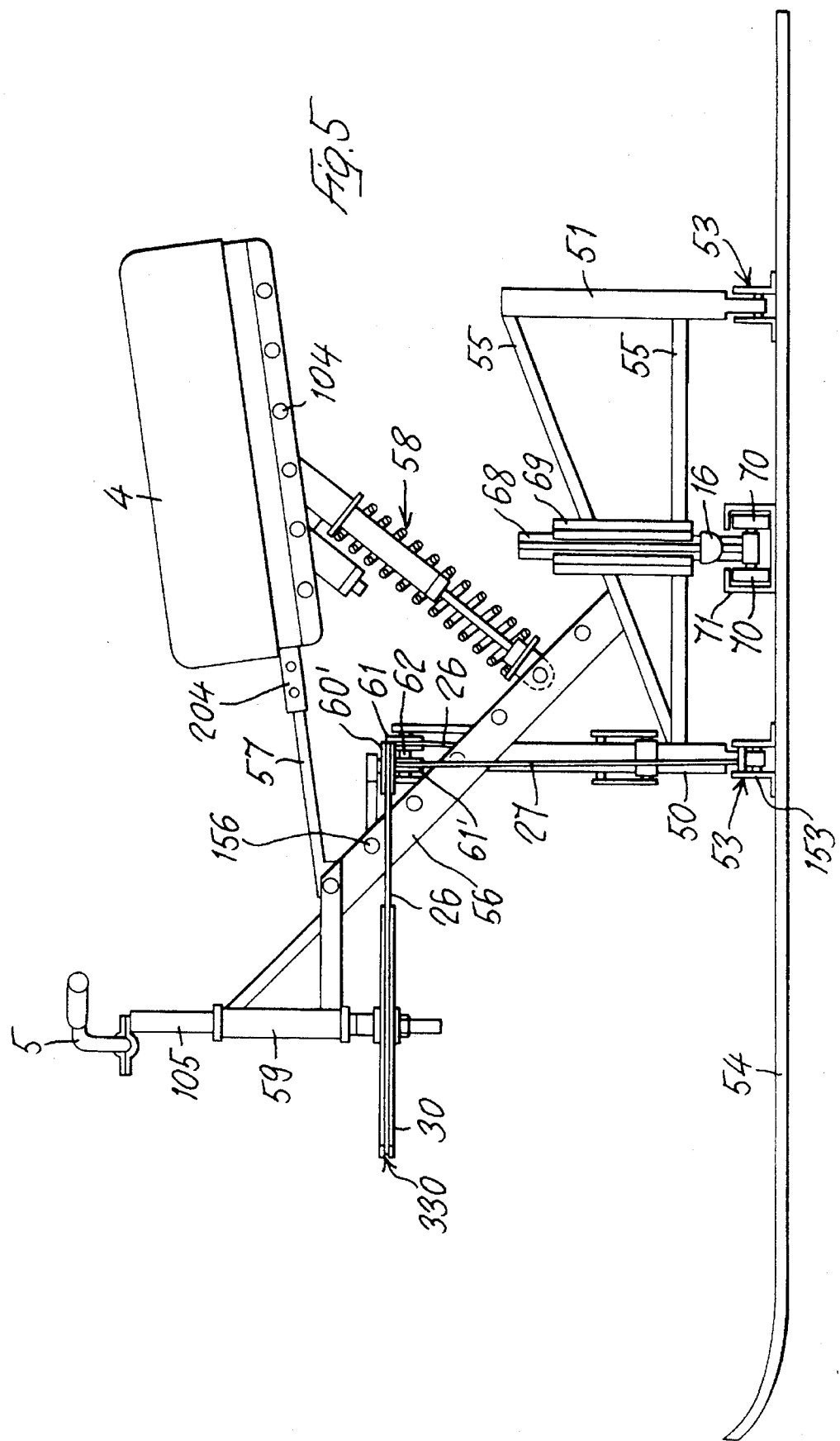

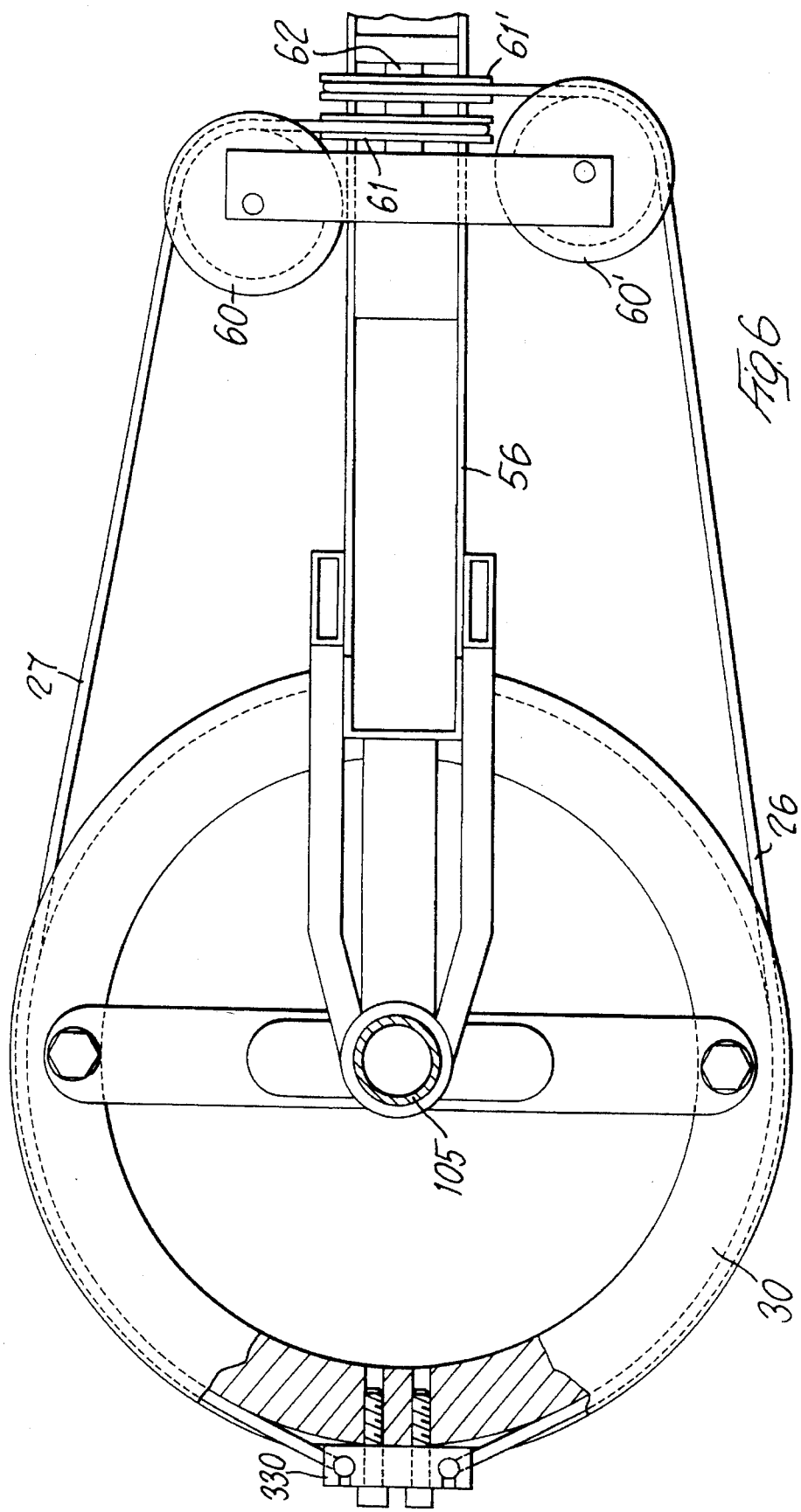

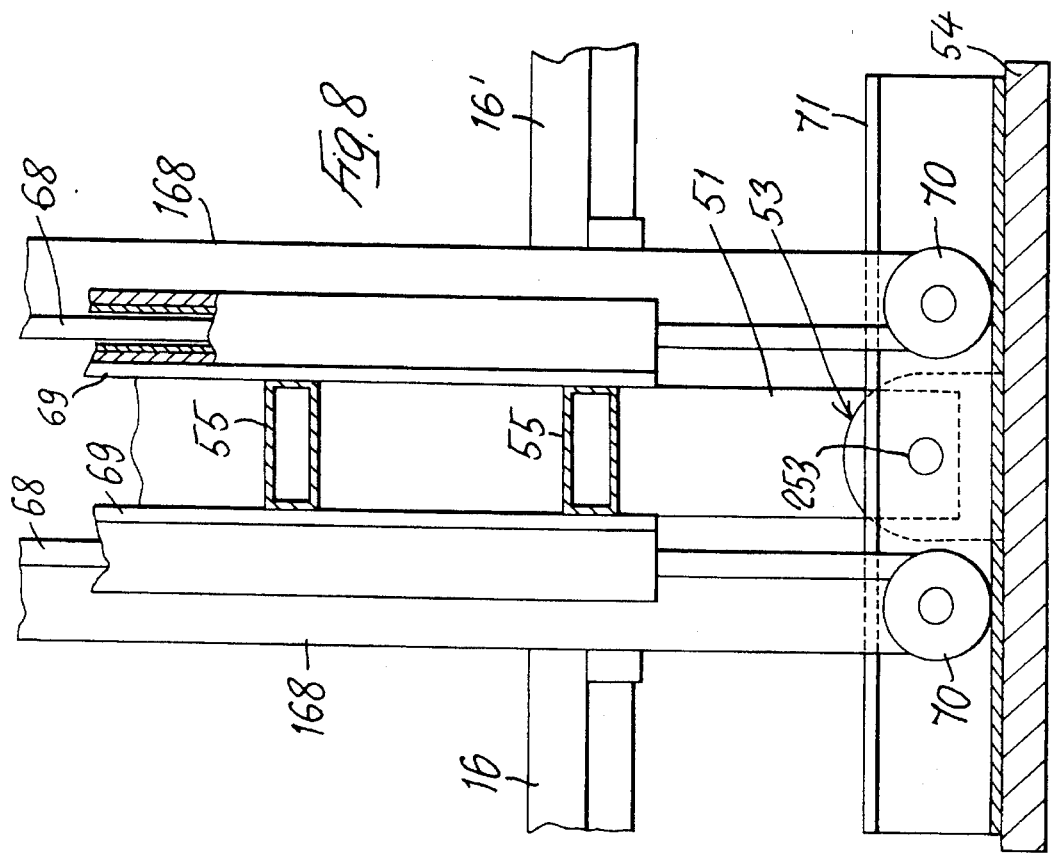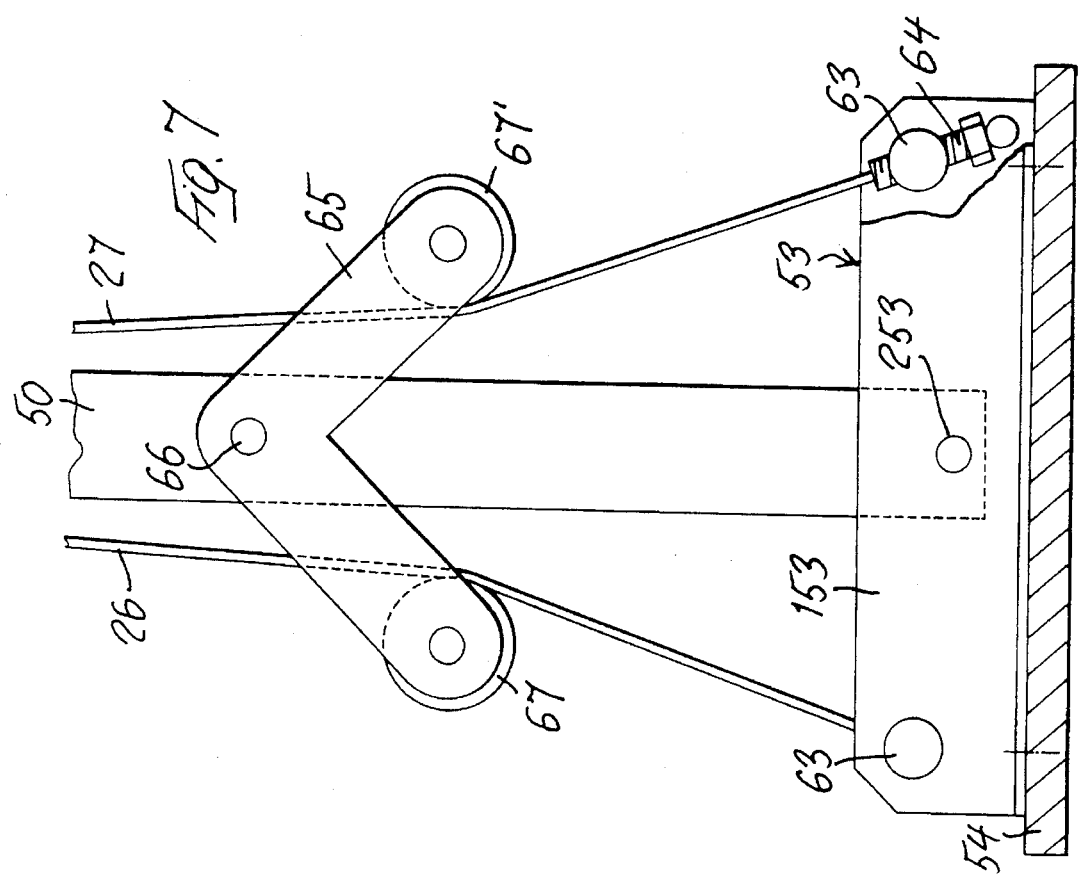

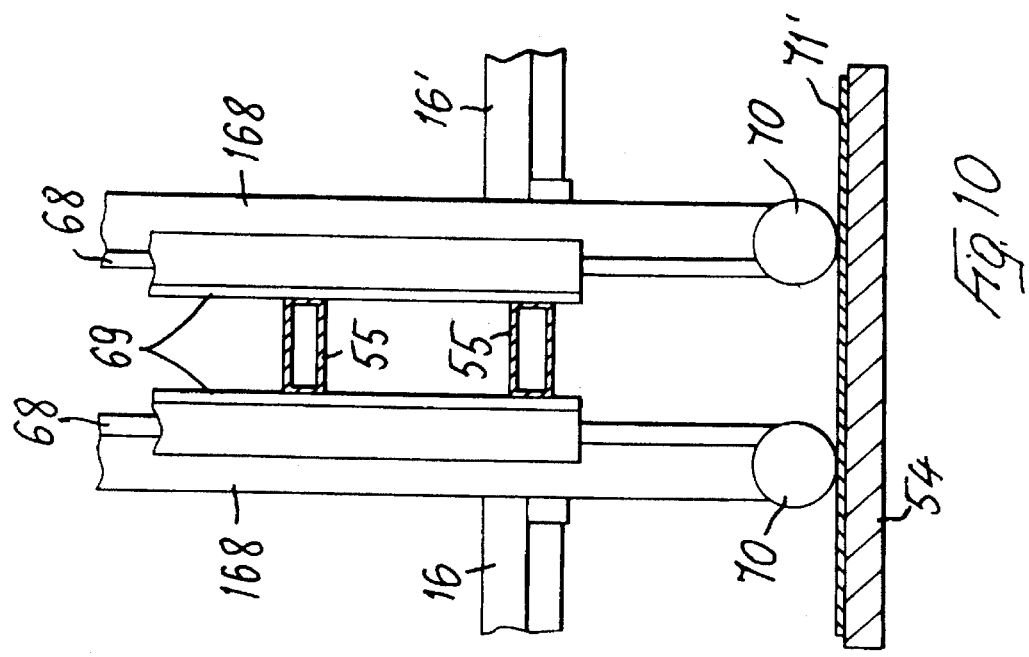
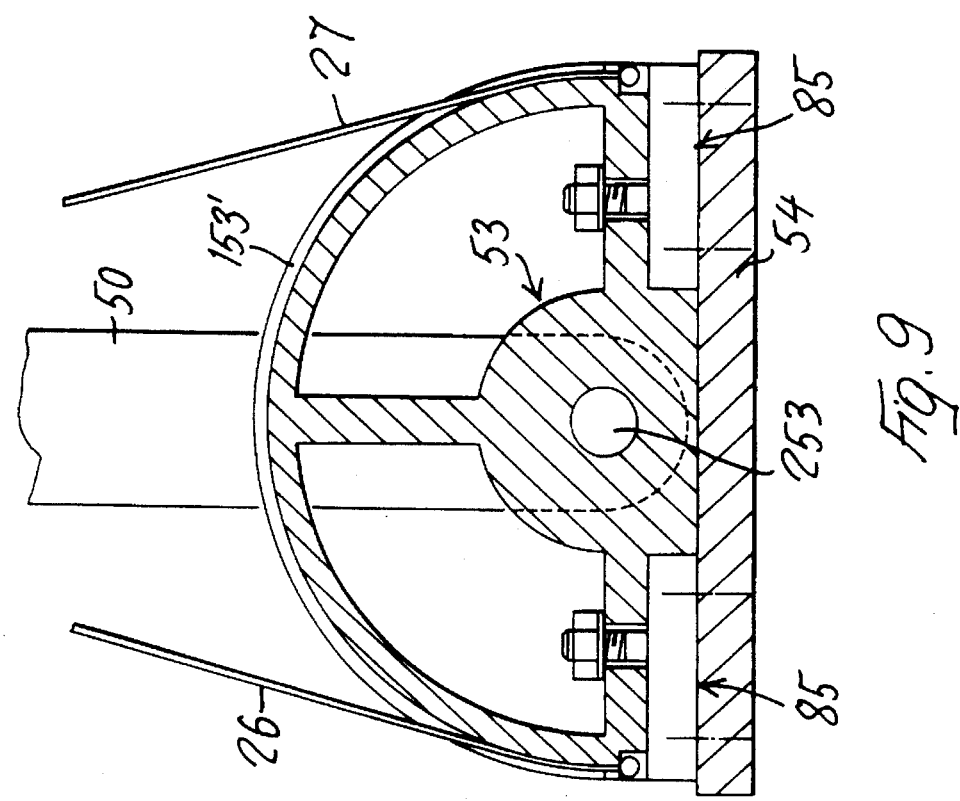

SNOW VEHICLE

The invention relates to a snow vehicle comprising at least one runner by way of a ski which is mounted in such a way that-it can be tilted and/or steered by means of manual tilting and/or steering members connected actively to actuators for tilting and/or steering the runner.

Snow vehicles of this kind are already known and may have no propulsion means and be suitable only for descent, for example of the kind more or less similar to a skibob fitted with at least one central ski, or of the kind known as snowmobiles, which do have engine traction.

In the first kind, that is those analogous to the skibob for descent over snow, the special qualities of dynamic behaviour of the ski are used for changing direction whether three or four points of support (that is skis) are provided or only one (that is a monoski).

In the case of snowmobiles, however, two or more points of support on the ground are generally provided for obvious reasons, with at least one providing traction.

As far as snowmobiles and/or skibobs with more than one point of support are concerned, the front points of support may consist generally of two runners by way of relatively short skis. Here again, for diverting from a straight-line path, it is known to exploit the behaviour characteristics of skis on the snow. However, instead of tilting the ski about its longitudinal axis, as already occurs naturally when tilting the frame while cornering, presenting the runners edge-on, the ski is turned about a perpendicular axis by means which transmit the angular movement of a handlebar or steering wheel to actuators which then produce an angular movement in each runner.

The object of the invention is to improve a snow vehicle of the kind described at the outset, in order by simple means and with a robust, lightweight and relatively inexpensive construction to achieve the greatest possible comfort and ease of use and the utmost steering reliability, improving in particular the cornering behaviour of said vehicle.

The invention achieves the above objects by the fact that the manual tilting and/or steering member is connected to the runner tilting and/or steering actuator by means of a transmission system constructed in such a way as to be mechanically rigid, i.e. with little or no play relative to the position of tilting and/or steering.

The transmission system may be formed by a combination of transmission cables and actuating and guiding pulleys, as well as by means for balancing out the tensions in the transmission cables in order always to subject the tilting and/or steering actuator, in any position of tilting and steering, to two mutually opposite forces relative to the movement of tilting and/or steering.

Alternatively, the transmission system may be formed by a mechanical system of levers or other similar members.

The motion of tilting and that of steering may also be combined with each other.

In particular, snowmobiles and/or skibobs with more than one point of support may present alternative configurations of the points of support, which may number four—two at the front and two at the back, or three—two at the front and one at the back, or one at the front and two at the back. Said points of support may consist either entirely or partly and in combination of skis and/or powered endless tracks or entirely of wheels, also powered.

In snowmobiles and/or skibobs with more than one point of support, steering may be applied simultaneously either to all three/four points of support, in phase or out of phase with each other, or partly, to the front carriage only or rear carriage only.

In a further improvement, the runners are supported by the vehicle frame by means of an articulated system of levers, similar for example to an articulated parallelogram, which is hinged so as to pivot about the longitudinal axis of the frame in order to produce the tilt about their longitudinal axis, that is to say a position of greater loading on the edge of the underside of the ski-like runner when compensating for centrifugal force with the weight of the body during the execution of the turn.

In this way the steering of the snowmobile or skibob makes it possible, by exploiting the rider's natural reactions, to achieve the best position of the runners relative to the floor as regards their dynamic behaviour over the snow.

In an improvement relating to a monoski skibob for descent over snow,.there are however additional means to connect the tilting motion of the monoski about its longitudinal axis to footrest brackets. This allows not only an automatic passive correction of the distribution of the rider's weight caused by the forced vertical movement of the footrest brackets, but also an action of assisting the tilting of the monoski by means of an active vertical force exerted by the feet on their respective footrests.

Also forming the subject of the invention are other features which further improve the snow vehicle described above and are the subject of the dependent claims.

The particular features of the invention and the advantages procured thereby will be seen in greater detail in the description of certain preferred embodiments: these are illustrated by way of nonrestrictive examples in the accompanying drawings, in which:

FIG. 3 is a view from above, partly in section, of the supporting means according to FIG. 2.

FIG. 4 is a view of the supporting means of the rear runners of the frame illustrated in the previous figures.

FIG. 5 is a lateral elevation of a snow vehicle with no powered means of traction, i.e. a snow vehicle for descent, fitted with a monoski.

FIGS. 6 to 8 show enlarged details of the transmission system for producing the tilt about the longitudinal axis of the monoski skibob either through a handlebar or through the feet.

FIGS. 9 and 10 show two details of a variant of the vehicle depicted in FIGS. 5 to 8.

Figure 13:
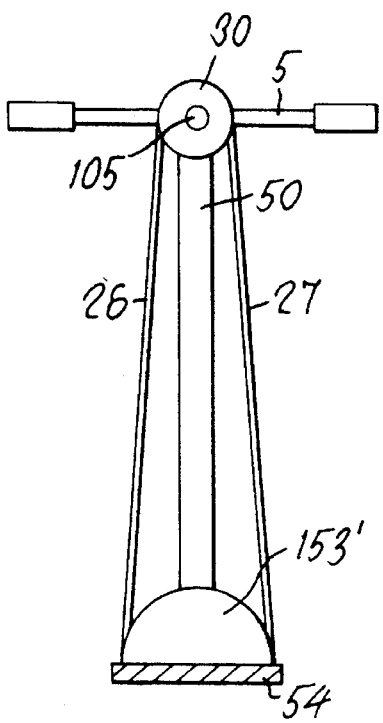
Figure 12:
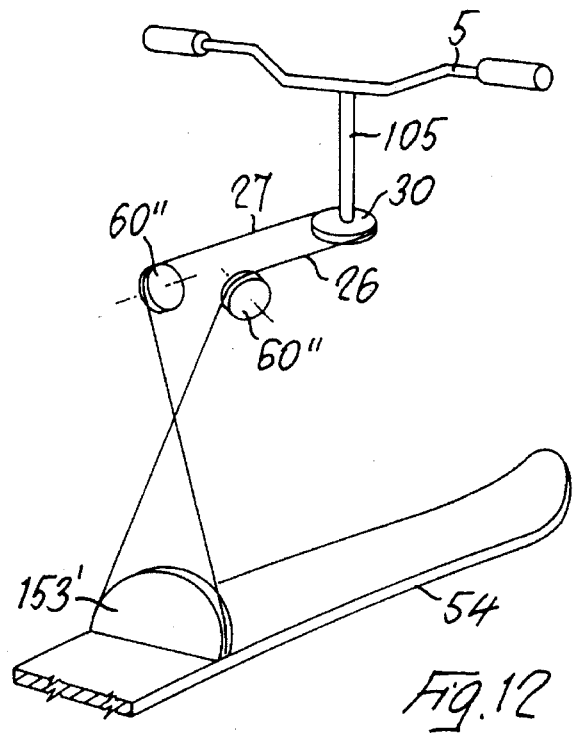

FIGS. 12 and 13 schematically show alternative embodiments of the vehicle shown in FIGS. 5 to 10.

With reference to FIGS. 1 to 4, a snowmobile/skibob frame consists of a load-bearing part 1 to which are attached two subframes 2, 3 for the front carriage and rear carriage. Mounted on the load-bearing part 1 of the frame is the saddle 4, while mounted rotatably at its front end is a handlebar 5. The subframe 2 of the front carriage consists of a system of pivoting arms hinged to each other which comprises two transverse arms 6, 8 positioned vertically one above the other and hinged at their mid points at 7 and 9 to the load-bearing part 1, in such a way that they can pivot about axes parallel with the longitudinal axis of the snowmobile. The lower pivoting arm 6 is longer than the upper pivoting arm 8, being in particular approximately twice its length, and is hinged so as to pivot about axes in the longitudinal direction of the snowmobile, at 10, 10', by its two ends directly to the top of a vertical runner-carrying arm 11, 11'.

The upper pivoting arm 8 is linked to a lower pivot point 12, 12' on the runner-carrying arm 11, 11' via a horizontal lever 13, 13', whose end furthest from the runner-carrying arm 11, 11' pivots about longitudinally oriented axes at the corresponding end of the upper transverse arm 8 via another lever 14, 14', which is hinged at 15, 15', at an intermediate, preferably middle point so as to pivot about a longitudinal axis, to an intermediate point on the lower transverse arm 6, preferably to a middle point thereof, between its pivot 10, 10' and its pivot 7.

Fixed to each runner-carrying arm 11, 11' is a transverse footrest bracket 16, 16' and below that a tubular cylindrical sleeve 17, 17', which is oriented vertically and inside which there is mounted, preferably on taper roller bearings and projecting below it a vertical rotatable stub shaft 18, 18'. Fixed to the free lower end of the stub shaft 18, 18' is a steering pulley 22, 22' with a downward axial supporting extension 19, 19' which is integral in rotation with said pulley. Said supporting extension is connected to the front runner 20, 20' which serves as a short ski, via a joint 21, 21' that pivots about a horizontal axis at right angles to the runner 20, 20'. Connected between an intermediate point on the front portion of each runner 20, 20' and the lower supporting extension 19, 19' is an elastic part 23, for example a helical spring that is loaded so as to exert a lifting action on the front portion of the runner 20, 20'. In particular, the vertical sleeve 17, 17' is integral with a plate 24, 24' that acts as a sheath stop and that covers the top of the pulley 22, 22', while the sleeve itself is fixed to the lower end of the runner-carrying arm 11 11' by means of a pin oriented diametrically across it in a fork 111, 111' and is kept from pivoting in the transverse direction by means of a length-adjustable rod, for example a screw coupling 25, 25' that is connected between the plate 24, 24' and the runner-carrying arm 11, 11', in particular the top pivot 10, 10'. This construction enables the camber of the skis 20, 20' to be adjusted.

In another improvement it is possible also to provide for adjustments to be made to the angle of attack of the skis 20, 20'. To this end the fork 111, 111' is so mounted on the remaining part of the runner-carrying arm 11, 11' as to be able to pivot about an axial pin 116 of the footrest bracket 16, which is perpendicular to the vertical mid plane of the frame, while locking means indicated 211 as a whole for example a lock pin or the like are provided to lock the fork 111 111' at a predetermined angle of attack relative to the runner-carrying arm 11, 11'.

The steering pulleys 22, 22' are engaged by respective pairs of control cables 26, 27, 26', 27'. Each cable 26, 27; 26'27' of the two pairs engages the associated steering pulley 22, 22' of one of the runners 20, 20' from the opposite side relative to its pair and is attached at its end to the pulley in a peripheral clamping block 122, 122' that is positioned centrally when the runners 20, 20' are pointing in the longitudinal direction of the snowmobile/skibob. The cables may also be attached by means of four clamps (two per pulley) or by means of two clamps (one per pulley) and using two cables only The control cables 26, 27, 26'27', are guided by sheaths 126, 127, 126', 127' connected between end stops 28, 29 on the runner-carrying arms 11, 11' (plates 24, 24') and on the load-bearing part 1 of the frame The four control cables 26, 27, 26'27' are controlled by a control pulley 30 which is mounted so as to be able to rotate coaxially and integrally with the shaft 105 of the handlebar 5. The control pulley 30 has two parallel peripheral grooves 130, 230 for the control cables 26, 27 and 26', 27' respectively leading to the two steering pulleys 22, 22'. Each pair of control cables 6, 27 and 26', 27' engages the control pulley 30 on opposite sides of the pulley in the same way as on the steering pulleys 22, 22'. The ends of the cables 26, 27, 26', 27' are attached to the control pulley 30 by means of a clamp 330 that is positioned centrally on the peripheral edge of the control pulley 30 when the handlebar 5 is pointing straight ahead.

Advantageously, in order that the steering action of the runners 20, 20' is in the same direction as the handlebar 5 is turned the cables 26, 27 and 26', 27' may also be connected to the control pulley 30 in reverse to the way they are connected to the corresponding steering pulley 22, 22' (FIG. 3).

The use of the steering pulleys 22, 22' and control pulley 30, as well as the guiding of the cables 26, 27, 26', 27' through sheaths connected between stationary end stops makes it possible to produce a mechanically rigid steering system with no play. In any steering position the take-up of the cable by the pulleys 22, 22', 30 means that the runner is efficiently held in the steering position by the opposing forces exerted by the two cables 26, 27 and 26', 27'

The members by which the runners 20, 20' are steered may of course also be constructed in other ways.

One alternative embodiment uses semicircular pulleys in place of the circular pulleys 22, 22', 30.

Another alternative (not shown) has, instead of the pulleys 22, 22', 30, levers that pivot about a central perpendicular axis, while the steering levers connected to the runners may be controlled by the lever connected to the handlebar by means of pairs of cables connected to the opposite free ends of the steering levers and of the control lever.

The cables can also be guided without use of sheaths or the like, but by means of one or more guide pulleys. Furthermore, if the system does not enable both cables of each pair connected to one runner to be simultaneously kept under tension, it is possible to use cable tensioning means acting automatically to take up any slack.

In another alternative (also not shown) the steering means may also consist of systems of levers, or of gears and shafts for the mechanically rigid transmission without play of the steering movement.

Alternatively, the steering means, or just the means by which the steering movement is transmitted, may also be hydraulic, pneumatic or electromechanical, while the steering means only may be remote-controlled or the like.

A subframe 3 forming a rear carriage projects from, and is hinged to by means of two parallel longitudinal members 32 positioned vertically one above the other, the load-bearing part 1 of the frame. The longitudinal members 32 are hinged at 31, to pivot about mutually parallel transverse axes, on the load-bearing part 1 of the frame. The end portion hinged to the load-bearing part 1 of the frame is guided laterally for a certain predetermined length between two mutually parallel vertical guide plates 33. The inside of the these guide plates 33 is coated with an antifriction material such as teflon or the like. This enables transverse stresses on the pivot pin 31 to be reduced, avoiding twisting or a certain transverse swaying of the rear carriage 3.

In an improvement in order to increase the lateral guiding of the longitudinal members 32, the latter possess a longitudinal projection 132 at the forward end past the pivot 31 that is also held between the two guide plates 33.

Preferably, in order further to enhance the suppression of the transverse twisting and/or swinging of the rear carriage, the end portion of the longitudinal members 32 held between the two guide plates 33 may also possess transverse fins 232 that extend in the vertical plane and for strengthening the longitudinal members at the point of pivoting 31, 31' and of widening of the surface of the members 32 where they bear against the guide plates 33.

The rear end of the longitudinal members 32 is hinged to the rear carriage subframe 3 in much the same way as has been described in relation to their hinging to the load-bearing part 1 of the frame. The rear end portions of the longitudinal members 32 are hinged at 31' and are guided between two parallel guide plates 33' which are sometimes laterally displaced because of the damping effect; the longitudinal members 32 are held between them for a certain length. These end portions may possess both longitudinal projections 132' and transverse wider portions 232' in the vertical plane.

The elastic suspension of the load-bearing frame part 1, on which the saddle 4 is rigidly mounted, relative to the rear carriage is provided by a suspension spring 41 with a damper 40 joined between the load-bearing frame part i and the longitudinal member 32 in an area underneath the saddle 4. In particular it is supported with a rear end portion of approximately half its length projecting and the suspension 40, 41 is hinged with one end near the middle of the saddle 4, approximately at the point of connection to the load-bearing part 1 of the frame and with the other end at a point on the upper longitudinal member 32 underneath the rear end of the saddle 4.

Figure 1:
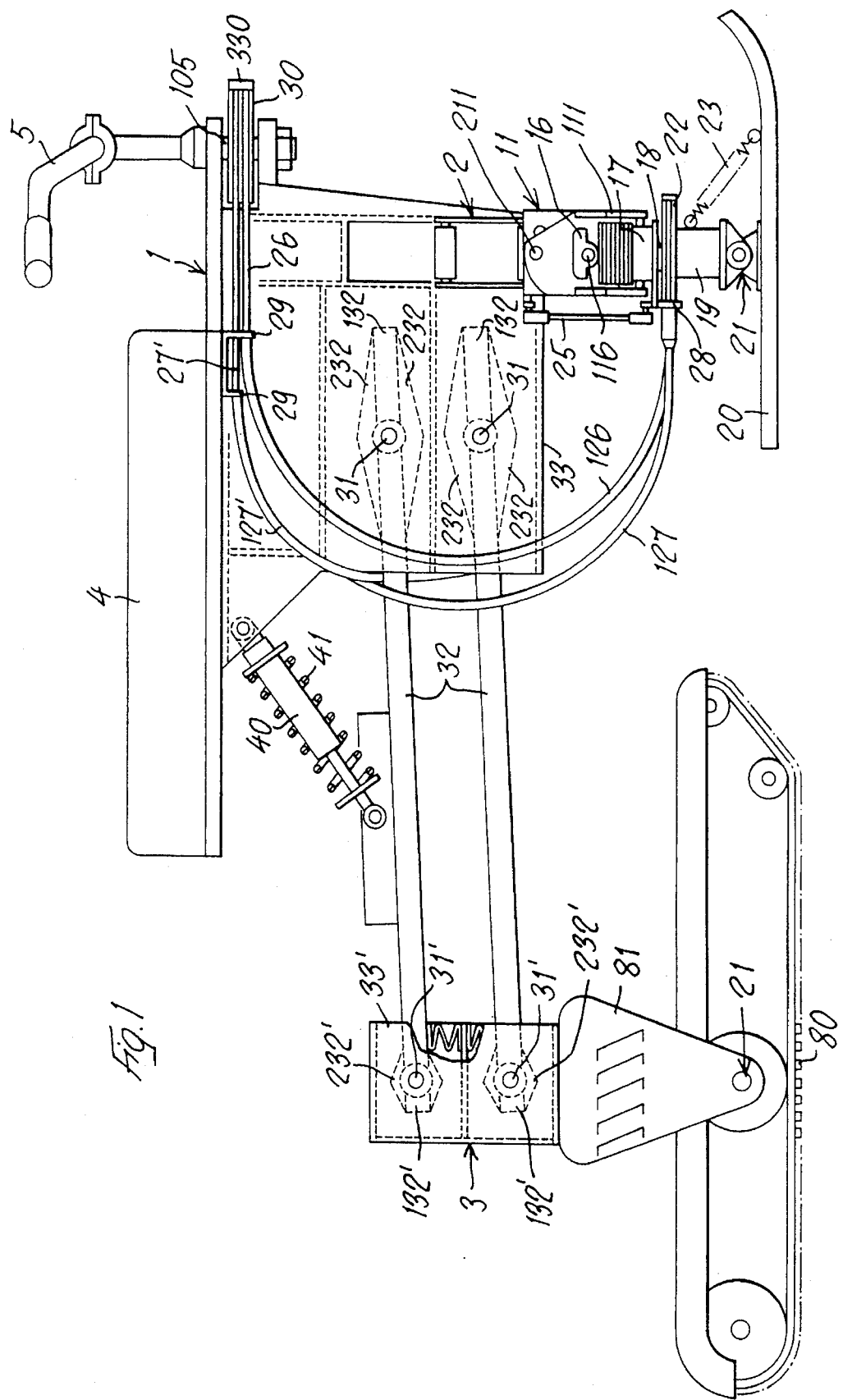
FIG. 1 is a lateral elevation of the frame of a snowmobile/skibob according to the invention.
Figure 2:
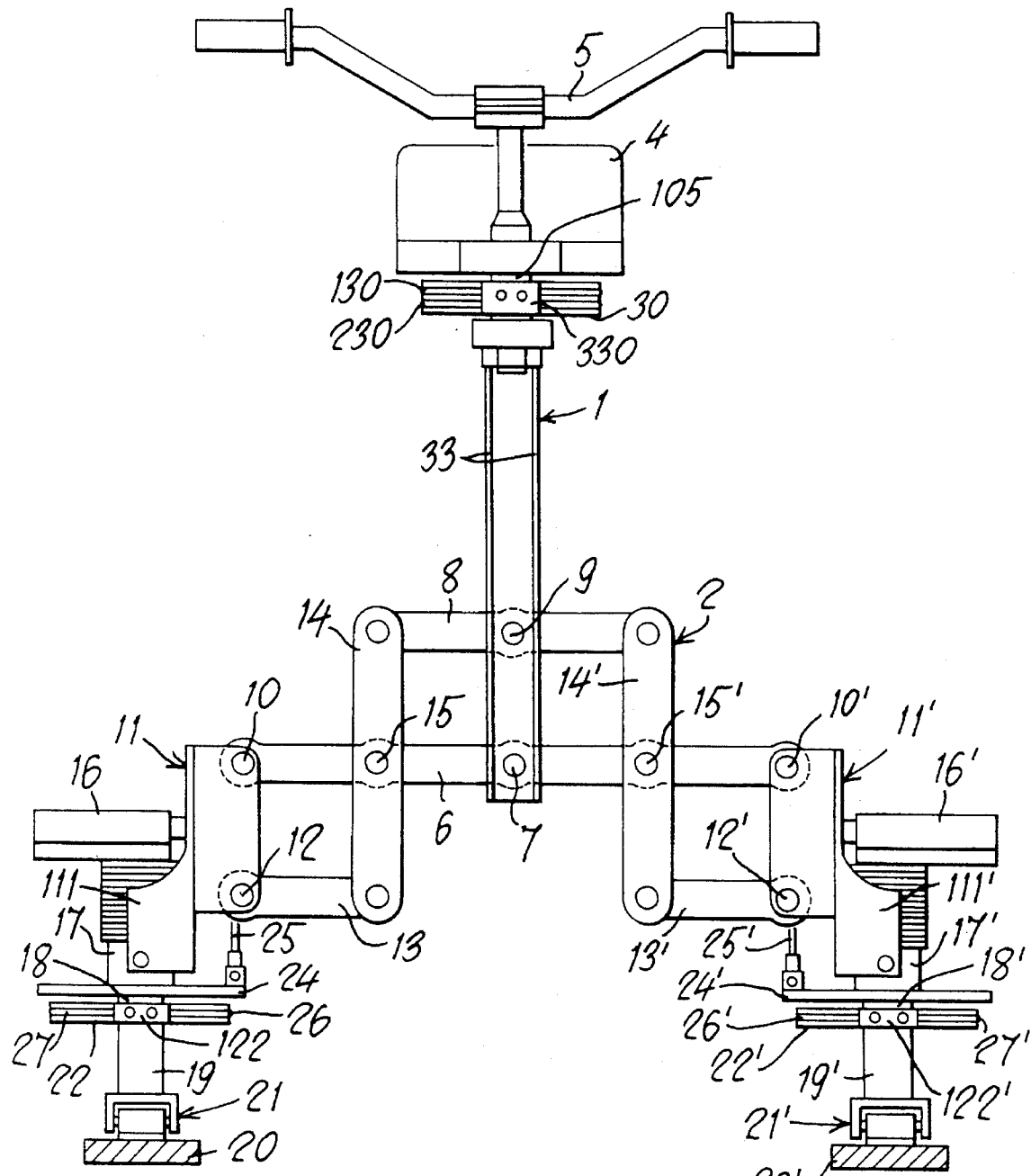
FIG. 2 is a front view of the front supporting means of the front runners of the frame according to FIGS. 1 and 3.
Figure 11:
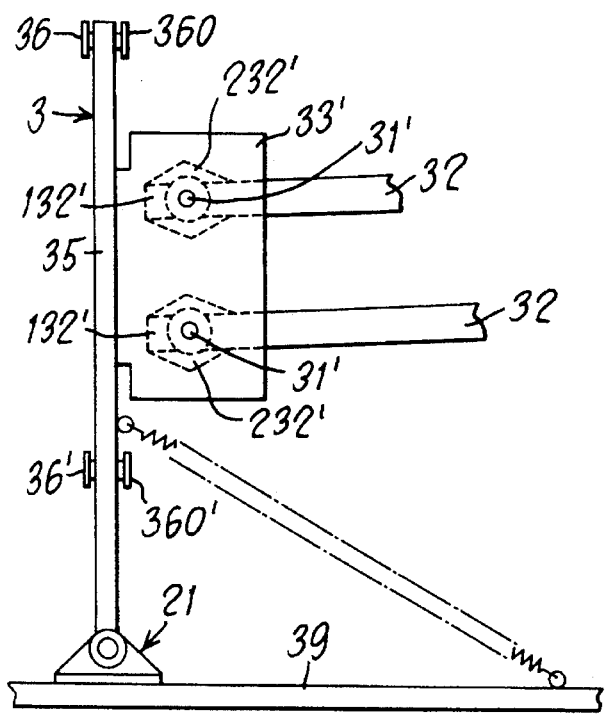
FIG. 11 is a lateral view of the rear carriage shown in FIG. 4.

In FIG. 1 there is mounted on the two rear guide plates 33' forming the rear carriage subframe 3 a motor unit 81 that drives a central longitudinal caterpillar track 80 coupled to the underside of the motor unit in an articulated manner. In FIGS. 4 and 11, the rear carriage 3 is constructed in the form of an articulated parallelogram. The central vertical upright 34 fixed to the two rear guide plates 33' is hinged to two or more (in particular two) vertical lateral uprights 35, 35' carrying the runners by means of two or more (in particular four) cross members 36, 360 36'360' which are hinged in their centres at 37, 37' to the top and bottom ends of the central upright 34. The cross members 36, 360, 36', 360' are hinged at their free ends respectively to the top ends of the two runner-carrying uprights 35, 35' and at a point situated at the same level as the lower pivot 37' to the central upright 34. In addition in order to confer a degree of stiffness and ensure an auxiliary force for returning the articulated parallelogram to its right-angled rest position (as shown), elastic parts 38, 38' for example helical springs, are provided between the upper pivot point 37 joining the cross member 36 to the central upright and the diagonally opposite lower pivot points joining the lower cross member 36' to the runner-carrying uprights 35, 35'.

The runner-carrying uprights 35 and 35' extend downwards past the central upright 34 and to these there are hinged, in the same way as to the front runners 20, 20', or to the endless track 80, by means of joints 21, the runners 39, 39', e g in the form of skis or powered endless tracks, while in both cases the runners 39, 39' and/or endless tracks may be secured to an elastic lifting part similar to the part 3 for the front runners 20, 20'. This arrangement means that if the equipment leaves the ground, the runner does not dig into the snow when it strikes it again, since the raising of the front end while off the ground guarantees a correct position when it next impacts the ground.

If the rear carriage 3 carries two runners 39, 39' it is possible to provide one or more powered endless tracks in an intermediate position of the vehicle for propulsion.

By adopting similar means to those used on the front runners 20, 20', it is of course possible to make the rear runner(s) endless track(s) 39, 39' steerable as well. In this case the rear runners 39, 39' can be made to execute a steering movement in phase or out of phase with the movement of the front runners 20, 20'. The construction described earlier for the frame of the snowmobile/skibob and steering means may also be applied in similar fashion to different configurations of runners, as for example where only three points of support on the ground are provided, two at the front and one at the back, or one at the front and two at the back, it being possible for these points of support to consist either entirely or in combination of skis/powered tracks or entirely of powered wheels or the like.

With reference to FIGS. 5 to 10, the snow vehicle illustrated is a descent vehicle with no means of powered traction and resembles a skibob fitted with a monoski.

The frame comprises two vertical ski-carrying uprights 50, 51 mounted in line and a distance apart in the longitudinal direction of the vehicle, and to which the part 54 is attached by means of joints 53 pivoting about an axis parallel with the central longitudinal axis of a ski or the like 54. The two vertical uprights 50, 51 are connected to each other by horizontal and inclined longitudinal members 55. Projecting forwards and upwards from the front upright 50 is another longitudinal member 56 at the top end of which there pivots in the vertical plane a saddle-carrying arm 57. The saddle-carrying arm 57 projects from its point of attachment towards the back of the vehicle, and between an intermediate point under the saddle 4 and the inclined longitudinal-member 56 is an elastic suspension unit 58 consisting of a damper and a spring. A vertical tube 59 inside which the shaft 105 of a handlebar 5 rotates is fixed to and projects forward from the front end of the inclined longitudinal member 56.

In an improvement, the longitudinal member 56 is inclined and may possess a plurality of points of articulation with the saddle-carrying arm 57, so that the height of the saddle can be adjusted. Furthermore both the saddle 4 and the longitudinal member 56 may possess a number of different points of articulation 104, 156 for the elastic suspension unit 58 mounted between them.

In addition, the mounting of the saddle 4 on the saddle-carrying arm may be adjustable relative to the arm in the longitudinal direction, for example using a tubular clamp 204 that can be tightened onto the saddle-carrying arm 57, or the like.

Also, the mounting of the handlebar-supporting tube 59 on the frame, that is on the longitudinal member 56, may be adjustable, particularly for both height and in relation to longitudinal position.

Any means of adjusting the position of the control pulley 30 and guide pulleys 60, 61, 60', 61' etc. may of course be adopted.

A control pulley 30 is fixed coaxially and coupled in rotation to the lower end of the shaft 105 projecting out of the tube 59. Two control cables 26, 27 can engage on opposite sides with the control pulley 30, to whose peripheral edge they are attached at a point coinciding with the longitudinal axis of the vehicle when the handlebar 5 is pointing straight ahead. They can be attached in particular by means of two clamps, or one clamp using a single cable or by means of a hooking block 330 which hooks the broadened ends of the cables 26, 27 (FIG. 6). Each cable 26, 27 is guided vertically down the front vertical upright 50 by means of two guide pulleys 60, 61, 60', 61' one of which 60, 60' is parallel with the control pulley 30 while the other 61, 61' is positioned tangentially to the first and rotates about a horizontal axis lying in the longitudinal direction of the vehicle.

The two vertical pulleys 61, 61' are preferably mounted coaxially one behind the other on a common axis 62. The lower ends of the cables 26, 27 are attached to the corresponding lateral edge of the ski 54 on each side of the joint 53 of the front upright 50. For this purpose the joint 53 consists of one or more—in this case two—cross members 153 mounted on the ski 54. The end of the front upright 50 pivots at 253 about the longitudinal axis of the ski 54 at a central point of the cross member 153. Each cable 26, 27 is attached to the corresponding end of the cross member 153 by means of clamps or hook means for securing the broadened ends of the cables, or the like.

In particular, the hook means consist respectively of a pin 63 lying in the longitudinal direction of the ski 54 and supported rotatably about its axis at the corresponding end of the cross member 153. Passing diametrically through the pin 63 is an externally threaded adjustment bush 64 through which the corresponding cable 26, 27 passes, and by its means the tension in the cables 26, 27 can be adjusted.

Turning the handlebar 5 in either direction causes the ski 54 to tilt about its longitudinal central axis in either direction so that the position of the ski 54 permits a change of direction.

The cables 26, 27 can of course be connected to the ski 54 without crossing over each other, so that there is a correspondence between the direction of rotation of the handlebar 5 and the tilt of the ski 54.

With reference to FIG. 7, in order to compensate for slack in the cable on the non-lifted side of the ski 54, a cable tensioning device is provided on the upright 50 above the joint 53 to compensate automatically for the slack. In this case, this device consists of an angled lever 65 presenting an angle of about 90°, in particular an adjustable angle, which is hinged, in the region of its vertex at 66 in a pivoting or fixed manner about an axis parallel with the longitudinal axis of the ski 54, to the front vertical upright 50, with its two diverging legs pointing preferably downwards, while tension rollers 67, 67' that each act from the exterior on the corresponding cable 27, 26 to deflect it towards the upright 50 are mounted so as to rotate idly about axes parallel with the pivot axis on the free ends of the lever 65. By this means an increase in the tension on one of the cables causes an increase in the deflection of the other cable towards the upright 50, and so the slack in that cable is compensated for. Mechanical rigidity and the absence of play in the transmission of the tilting motion is guaranteed in this way where instead of the pulley 30 and half-pulley 153' there are only or partly rods 153.

The cable tensioning means may also take other forms. It may for example comprise two arms that pivot laterally outwards relative to the frame in the manner of an inverted pair of compasses and that act from the inside through rollers at their free ends on the vertical lengths of the cables 26, 27. Said arms are also stressed by springs outwards into said lateral position.

Another variant may take the form of a transverse push rod which slides in a tubular transverse guide and is interposed between said vertical lengths of the cables 26, 27, which it acts on through rollers mounted on its ends.

With reference to FIGS. 5 and 8, in another improvement, between the two vertical uprights 50, 51 of the frame are two footrest brackets 16'. Advantageously, to permit both a passive correction of weight distribution favourable to a deflection from a straight path and more particularly an additional active action to assist the tilting of the ski 54, the footrest brackets 16' are mounted on vertical slides 68 and are connected by means of a transmission to the corresponding lateral edge of the ski 54. The vertical slides 68 consist of a T section that slides freely inside a complementary vertical guide 69 fixed to the frame. The bottom end of each slide 68 carries a roller or a pair of coaxial rollers 70 that revolve about an axis parallel with the longitudinal axis of the ski 54. The rollers 70 in turn are engaged in a transverse rolling guide 71 fixed to the top surface of the ski 54. The footrest 16' is fixed at a suitable position to the central rib 168 of the corresponding T section which projects out through a longitudinal slot in the guide 69. When the ski 54 is tilted in any position, therefore, the footrests 16' will be displaced vertically by an amount corresponding to the tilt of the ski 54 itself. Since moreover the transmission is reversible, the application of a differential force to the two footrests 16' helps in the tilting of the ski 54.

The vertical slides 68 may also have simple supports of any kind on the top surface of the ski 54. Preferably, when as shown in FIGS. 8–10 the joints 53 are fixed removably, by means of quick-release attachments 85, to the ski 54, a plate of antifriction material 71' illustrated in the variant shown in FIG. 10 may be interposed between said supporting parts, for example the rollers 70, and the top surface of the ski. It is also possible to provide a return spring between the frame or the edge of the ski 54 and the vertical slides 68. The quick-release attachments 85 are so constructed that the ski 54 detaches from the subframe without it being necessary to dismantle the tilt actuators from said subframe.

In the same way as described in relation to the example of the snowmobile FIGS.1 to 4, here again a number of alternative embodiments are possible. As well as using additional damping components particularly for the various joints or omitting the damping components that have been described it is also possible to employ a number of kinds of system for tilting the ski 54.

In one variant it is possible to avoid the use of the cable tensioning means by replacing the cross member(s) 153 of the joint 53 to which the cables 26, 27 are attached with a half-pulley 153' (FIG. 9). The control pulley 30 may also be replaced by a half-pulley. The control pulley 30 can be replaced too, by a simple transverse arm rotating integrally with the handlebar 5 and projecting on diametrically opposite sides from its shaft 105, the two cables 26, 27 being attached to the opposite ends of the transverse arm.

It is possible, instead of the four guide pulleys 60, 61, 60', 61' for the cables 26, 27, to adopt solutions that include only two pulleys 60", for example two pulleys with oblique axes and cables that may or may not cross over each other (FIG. 12), or two pulleys with transverse horizontal axes and cables parallel with each other.

If a handlebar 5 is used that revolves in the vertical plane, that is on a horizontal axis, and is fitted with a coaxial control pulley 30, the cables can be connected directly to the ski 54, i.e. to the cross member 153 or half-pulley 153', as shown in FIG. 13. Furthermore the guide pulleys can be eliminated altogether and replaced by cable running guides with appropriately calculated friction on their running surfaces, or by guide sheaths in the same way as in example FIGS. 1 to 4.

Once again in this case it is possible to use alternative mechanical systems, such as systems of levers or shafts, gears and racks, or indeed hydraulic, pneumatic and electromechanical systems and combinations of these. In the case of the steering (18, 18') only, it is also possible to use remote-control systems.

I claim:
1. A snow vehicle comprising:
   at least one steering runner pivotable about a longitudinal central axis of the vehicle by means of at least two longitudinally separated joints; and
   steering means comprising a handle bar rotatably mounted about a vertical axis of the vehicle, a control pulley integrally rotatable with said handle bar, and a pair of cables connected to said control pulley and to said at least one runner for manually controlling tilt of said at least one runner.

2. The snow vehicle according to claim 1 further comprising cable tensioning means for balancing tensions in said cables.

3. The snow vehicle according to claim 2 wherein said cable tensioning means comprises an angled arm hinged about an intermediate axis between said pair of cables, said angled arm having a tensioning roller at each end thereof engaging a corresponding portion of the cables.

4. The snow vehicle according to claim 1 wherein said at least one steering runner is mounted on a front carriage subframe hinged to a load-bearing frame of said vehicle.

5. The snow vehicle according to claim 4 further comprising a rear carriage subframe projecting backwards from said front carriage subframe.

6. The snow vehicle according to claim 5 further comprising endless tracks mounted on said rear carriage subframe.

7. The snow vehicle according to claim 5 wherein the rear carriage subframe is hinged to the load-bearing frame by two central longitudinal members positioned vertically one above the other and pivotable about horizontal axes at right angles to the vehicle, opposite ends of the central longitudinal members being guided laterally between two vertical plates separated by a gap and coated on an inside thereof with an antifriction material.

8. The snow vehicle according to claim 7, wherein each of said two central longitudinal member includes an axial projection which is guided between the two plates and transverse fins on sides thereof in contact with the guide plates to increase surface area in contact with the guide plates and strengthen the longitudinal members at pivot points.

9. The snow vehicle according to claim 4 further comprising at least two steering runners mounted on the front carriage subframe.

10. The snow vehicle according to claim 9 wherein said front carriage subframe comprises an articulated parallelogram including an upper transverse arm positioned above a lower transverse arm in a vertical plane, said lower transverse arm being longer than said upper transverse arm, said two transverse arms being hinged at midpoints thereof, said transverse arms being pivotable about axes parallel to the longitudinal axis of the vehicle attached to a free lower end of the shaft.

11. A snow vehicle according to claim 10 further comprising:
two steering pulleys, each of said steering pulleys being connected to a respective one of said two front steering runners; and
at least two pairs of cables, each of said pairs of cables being connected to said control pulley and to a respective one of said steering pulleys.

12. A snow vehicle according to claim 11 further comprising two vertical runner-carrying arms having taper bearings for rotatably supporting said two steering pulleys about a steering axis, transverse ends of said runner-carrying arms being supported on said front carriage subframe, each end of said lower transverse arm being directly hinged to a top of a respective one of said runner carrying arms, each end of said upper transverse arm being connected to an end of a respective vertical lever, opposite ends of said vertical levers being linked to respective ends of horizontal levers having opposite ends linked to a respective one of said runner-carrying arms, said horizontal levers being positioned in said vertical plane below said lower transverse arm, said vertical levers being hinged to said lower transverse arm at intermediate points thereof.

13. The snow vehicle according to claim 12 further comprising:
transverse footrest brackets fixed to a respective one of said runner-carrying arms;
tubular cylindrical sleeves positioned vertically beneath said transverse footrest brackets; and
vertical rotatable stub shafts mounted inside and projecting below said footrest brackets, said steering pulleys being fixed to lower free ends of said stub shafts, said steering pulleys including downward axial supporting extensions integral in rotation with said steering pulleys, said supporting extensions being connected to said front steering runners by joints pivotable about a horizontal axis at right angles to said front steering runners.

14. The snow vehicle according to claim 13 further comprising vertical sleeves for supporting said stub shafts, said vertical sleeves being pivotable at right angles to the longitudinal axis of the vehicle in forks of the runner-carrying arm by means of longitudinal diametrical pins, and length-adjustable rods for preventing said sleeves from pivoting freely in a transverse direction of the vehicle and allowing adjustment of said sleeves relative to the transverse direction.

15. The snow vehicle according to claim 14 wherein each of said length-adjustable rods comprises a screw coupling connected between a plate integral with one of said vertical sleeves and the respective runner-carrying arm.

16. The snow vehicle according to claim 13 wherein each of said runner-carrying arms comprises a stationary part articulated to said front carriage subframe, said forks being mounted on said stationary part and pivotable about the transverse horizontal axis of the vehicle, said vehicle further comprising means for locking together said runner-carrying arms in a predetermined relative angular position.

17. The snow vehicle according to claim 9 further comprising means for adjusting a camber of the front steering runners.

18. The snow vehicle according to 9 further comprising means for adjusting an angle of attack of the front steering runners.

19. The snow vehicle according to claim 1 wherein said at least one runner comprises a single central runner and said pair of cables have one end fixed to respective lateral edges of said central runner.

20. The snow vehicle according to claim 19 further comprising a pair of guide pulleys engaging each of said cables, a first of said pair of guide pulleys being rotatable about a transverse horizontal axis and a second of said pair of guide pulleys being rotatable about an axis parallel to a longitudinal axis of the vehicle, said cables crossing over each other.

21. The snow vehicle according to claim 19 further comprising at least two guide pulleys engaging respective cables, said guide pulleys being rotatable about oblique axes.

22. The snow vehicle according to claim 19 further comprising at least two guide pulleys engaging respective cables, said guide pulleys being rotatable about a horizontal axis at right angles to said longitudinal axis.

23. The snow vehicle according to claim 19 wherein said handlebar and said control pulley are rotatable about a longitudinal, horizontal central axis of said vehicle.

24. The snow vehicle according to claim 19 further comprising a tilting actuator connected to said control pulley by cables guided in sheaths connected between stationary end stops.

25. The snow vehicle according to claim 19 further comprising stationary running supports having a calculated friction engaging said guide pulleys.

26. The snow vehicle according to claim 19 further comprising two footrest brackets positioned above respective lateral edges of said central runner and connected dynamically to respective lateral edges thereof, said brackets being movable in a vertical direction to correspond with an angle of tilt of said central runner.

27. The snow vehicle according to claim 26 wherein each of said footrest brackets is mounted on a vertical slide which slides vertically inside a complementary vertical guide on said vehicle, said vertical slide having a bottom end engaging, by means of at least one roller rotatable about a horizontal axis oriented in a longitudinal direction of the runner, a fixed cylindrical part comprising an antifriction material in a guide fixed transversely on said central runner.

28. The snow vehicle according to claim 1 further comprising a saddle supported on a load-bearing frame of the vehicle.

29. The snow vehicle according to claim 28 further comprising a suspension unit comprising a spring and a damper interposed between a middle point of the saddle and a longitudinal member beneath the saddle.

* * * * *